(12) United States Patent
Klettke

(10) Patent No.: US 7,334,932 B2
(45) Date of Patent: Feb. 26, 2008

(54) LED-TUBE HYBRID LIGHTING ARRANGEMENT

(75) Inventor: Oliver Klettke, Nürnberg (DE)

(73) Assignee: Diehl Luftfahrt Elektronik GmbH, Nürnberg (DE)

( * ) Notice: Subject to any disclaimer, the term of this patent is extended or adjusted under 35 U.S.C. 154(b) by 149 days.

(21) Appl. No.: 11/110,080

(22) Filed: Apr. 20, 2005

(65) Prior Publication Data

US 2005/0237766 A1    Oct. 27, 2005

(30) Foreign Application Priority Data

Apr. 24, 2004    (DE) ...................... 10 2004 020 122

(51) Int. Cl.
*F21V 7/04* (2006.01)
(52) U.S. Cl. ...................... 362/612; 362/628; 362/555; 362/231
(58) Field of Classification Search ........ 362/612–614, 362/555, 628, 605, 559, 800, 558, 231, 335, 362/244, 12, 217, 227, 228, 551
See application file for complete search history.

(56) References Cited

U.S. PATENT DOCUMENTS

| | | | |
|---|---|---|---|
| 2,404,627 A | 7/1946 | Goldberg | 362/317 |
| 5,555,161 A * | 9/1996 | Roe et al. | 362/555 |
| 6,203,180 B1 | 3/2001 | Fleischmann | 362/471 |
| 6,250,796 B1 | 6/2001 | Huang | 366/270 |
| 6,422,710 B1 * | 7/2002 | Herzog et al. | 362/555 |
| 6,639,349 B1 * | 10/2003 | Bahadur | 313/483 |
| 7,160,012 B2 * | 1/2007 | Hilscher et al. | 362/555 |
| 2005/0105302 A1 * | 5/2005 | Hofmann et al. | 362/555 |

FOREIGN PATENT DOCUMENTS

| | | |
|---|---|---|
| DE | 296 20 583 U1 | 11/1996 |
| DE | 100 65 020 A1 | 12/2000 |
| DE | 202 11 305 U1 | 7/2002 |
| EP | 1 293 382 A2 | 7/2002 |
| JP | 2002197911 A | 7/2002 |
| WO | WO 03/059012 A1 | 1/2003 |

* cited by examiner

*Primary Examiner*—Sandra O'Shea
*Assistant Examiner*—Bao Q. Truong
(74) *Attorney, Agent, or Firm*—Scully, Scott, Murphy & Presser, P.C.

(57) ABSTRACT

A lighting arrangement (1) of a space-saving configuration, including a fluorescent lamp (2) and at least one light emitting diode (6), which is suitable in particular for use for interior lighting of an aircraft. In this case the light emitting diode (6), viewed in the direction of a main lighting direction (13), is arranged behind the fluorescent lamp (2). The lighting arrangement (1) further includes a light guide element (10) which is adapted to guide light (L2) emitted by the light emitting diode (6) past the fluorescent lamp (2) and emit it substantially in the main lighting direction (13).

21 Claims, 1 Drawing Sheet

LED-TUBE HYBRID LIGHTING ARRANGEMENT

BACKGROUND OF THE INVENTION

1. Field of the Invention

The invention relates to a lighting arrangement comprising a fluorescent lamp (or tube) and at least one light emitting diode (or LED), which is provided in particular for the interior lighting in a vehicle, in particular in a passenger aircraft.

2. Discussion of the Prior Art

Hitherto fluorescent lamps have predominantly been used for illuminating the interior of an aircraft. The user of fluorescent lamps is advantageous insofar as they make it possible to produce white light with a frequency spectrum which is pleasant for the human eye, with a particularly high light yield. The advantage of a high light yield is of great significance in particular in regard to the interior lighting of a vehicle, especially as here on the one hand the space available for lighting units is seriously restricted. The constricted space circumstances and the necessarily good insulation of the passenger cabin of a passenger aircraft on the other hand mean that the loss heat generated by the lighting arrangement is only comparatively poorly dissipated.

With the exclusive use of fluorescent lamps however it is on the other hand scarcely possible to alter the brightness of the interior lighting or to vary the colour spectrum thereof. That is found to be a disadvantage in many situations. In the design of a modern lighting arrangement, particularly in aircraft engineering, use is increasingly frequently made of the realisation that the mood and thus the wellbeing of the aircraft passengers, particularly in the case of long intercontinental flights, can be positively influenced by adapting the interior lighting to the daytime situation. Such lighting concepts are also summarised by using the term 'mood lighting'. Thus for example interior lighting with a high proportion of blue has a calming effect and can thus promote relaxation of the passengers during a night flight. Equally a continuous and slow change in the lighting mood which for example simulates the change in light which takes place during a sunrise or sunset, can be desirable.

In order to permit a variation of that nature in the lighting effect, light emitting diodes are increasingly used for the purposes of interior lighting in an aircraft. A light emitting diode however in itself has the disadvantage, in relation to a fluorescent lamp, of a comparatively low level of brightness and a comparatively high level of lost power which is dissipated in the form of heat. The respective advantages of fluorescent lamps and light emitting diodes are synergistically utilised by the use of a hybrid lighting arrangement in which a white basic light component is produced by fluorescent lamps and the colour spectrum of which is modified by means of coloured light emitting diodes. Such a hybrid lighting arrangement however frequently takes up a comparatively large amount of space and therefore for precisely that reason can be only limitedly used in an aircraft.

SUMMARY OF THE INVENTION

The object of the invention is to provide a hybrid lighting arrangement with a fluorescent lamp and at least one light emitting diode, which is intended in particular for the interior lighting of an aircraft and which is of a compact structure and which has advantageous operating properties.

That object is attained by the provision of a lighting arrangement including a fluorescent lamp and at least one light emitting diode, viewed in the main lighting direction, is to be arranged behind the fluorescent lamp, and the light produced by the light emitting diode is to be guided past the fluorescent lamp by means of a light guide element so that the above-mentioned colored light is emitted substantially in the main lighting direction. In that respect the term main lighting direction is used to denote that direction in which the light produced by the lighting arrangement is preferably emitted, by virtue of the structural configuration of the lighting arrangement. If the lighting arrangement produces a substantially rotationally symmetrical or plane-symmetrical light cone, then the main lighting direction is given in particular by the axis of symmetry of that light cone.

The successive arrangement of the fluorescent lamp and the at least one light emitting diode makes it possible for the lighting arrangement to be of a very narrow structural form which is particularly suitable especially for use in an aircraft. In addition the light produced by the light emitting diode covers a comparatively long distance within the light guide element, until it issues into the interior space to be lit. That is advantageous in particular if a plurality of, in particular multi-coloured, light emitting diodes are provided in the lighting arrangement, especially as the light of the light emitting diodes is already mixed within the light guide element so that this avoids a spotty, 'restless' interior lighting effect.

Particularly uniform lighting is achieved in an embodiment of the invention which in that respect at the same time particularly saves space, in which the light guide element is in the form of a hollow shape which is substantially symmetrical with respect to the main lighting direction and which is open in the main lighting direction and in which the fluorescent lamp is at least partially received. The symmetrical configuration of the lighting arrangement has the further advantage that it is possible to use a single structural shape for the lighting arrangement on both sides of the passenger cabin of an aircraft. In contrast to an asymmetrical structure in which two mirror-image variants always have to be manufactured and stored, it is thus possible to save on manufacturing and stockkeeping costs.

Preferably, the arrangement uses a fluorescent lamp which is in the usual form of an elongate straight tube. Particularly adapted to that form of the fluorescent lamp is a light guide element which is substantially in the shape of a segment of a hollow cylinder, that is to say a hollow cylinder which is cut open along its length. Preferably the angle of opening of that hollow cylinder segment is about 180° so that the light guide element essentially assumes the shape of a hollow cylinder which has been halved along its length. Variations in the light guide element to afford larger or smaller angles of opening can however be advantageous, for adaptation to a specific lighting geometry.

In order to ensure that the light emitted by the light emitting diode is well coupled into the light guide element, the latter is preferably provided with one or more receiving means, into each of which is inserted a respective light emitting diode, with its light emitting end. If the light guide element is of a symmetrical structure with respect to the main lighting direction, the receiving means is desirably also centered with respect to the axis of symmetry of the light guide element. Effective and symmetrical coupling of the light produced by the light emitting diode into the light guide element is further preferably achieved by the use of a so-called 'side emitter' light emitting diode. That term is used to denote a specific structural configuration of a light emitting diode, in which the predominant proportion of the light produced is emitted not in the direction which is in diametrally opposite relationship to the contact side of the light emitting diode, but laterally, and thus substantially at a right angle to the main lighting direction.

Preferably the lighting arrangement includes a plurality of light emitting diodes which are arranged in a row in parallel relationship with a longitudinal axis of the light guide element. In order to have a particularly large range of variation in regard to the colour spectrum which can be achieved, that arrangement advantageously uses light emitting diodes of differing colours, wherein the various colours are respectively arranged in alternate relationship with each other.

In order as far as possible to suppress longitudinal propagation of light within the light guide element and thus to ensure that the greatest possible proportion of the light produced by the light emitting diode is irradiated into the interior to be lit, by way of the intended light exit surface of the light guide element, a guide structure is advantageously introduced into the light guide element between adjacent light emitting diodes. Such a guide structure can be embodied in particular by an interruption in the light guide element, the interruption being of such a shape that the light which is propagated in the longitudinal direction within the light guide element is deflected in a condition of total reflection in the direction of a light exit surface.

In order further to increase the efficiency of the lighting arrangement, an embodiment of the invention provides that the inside surface of the light guide element is formed for example by a reflective coating, as a reflector for the light produced by the fluorescent lamp.

Comparatively good thermal coupling in respect of the or each light emitting diode is desirably achieved in that the or each light emitting diode is mounted on a metallic carrier element of the lighting arrangement.

The light guide element desirably comprises polycarbonate, especially as that material is particularly suitable, both in regard to its transparency and also in regard to its resistance to the thermal and UV radiation loading which typically occurs in use in an aircraft.

BRIEF DESCRIPTION OF THE DRAWINGS

An embodiment of the invention is described in greater detail hereinafter with reference to the drawing in which.

DETAILED DISCUSSION OF THE INVENTION

Mutually corresponding parts and parameters are denoted by the same references in the Figures.

Figure 1:
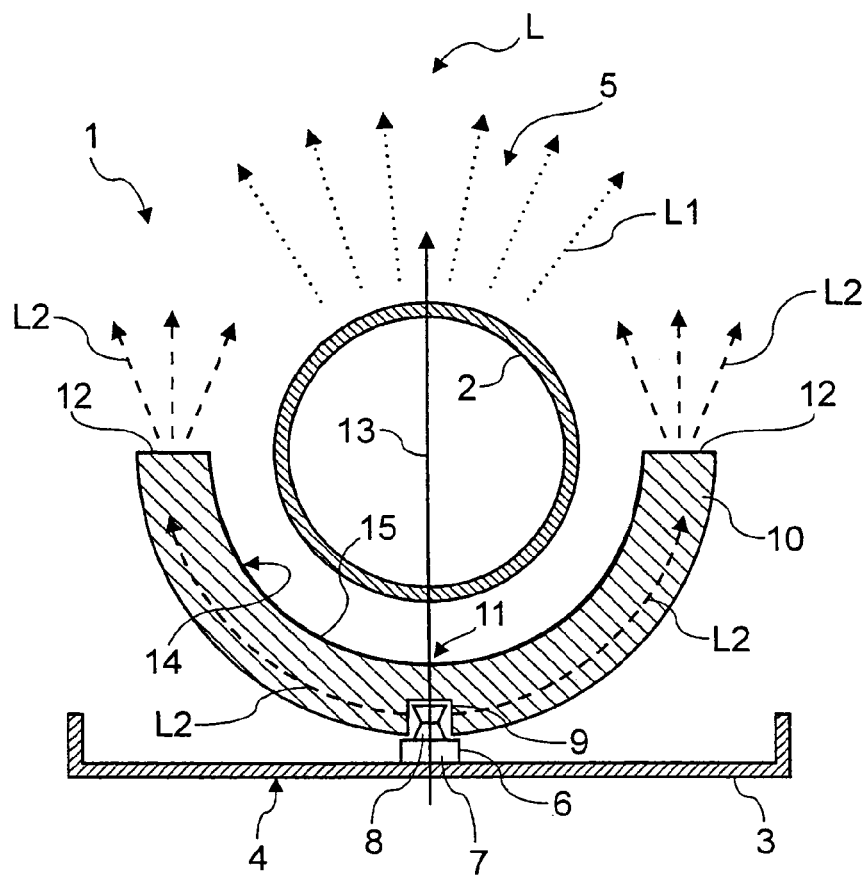
FIG. 1 is a diagrammatic cross-section through a lighting arrangement with a fluorescent lamp, a light emitting diode (LED) and a light guide element.

The lighting arrangement 1 illustrated in FIG. 1 includes a fluorescent lamp 2 which is in the form of a straight elongate tube and which is contacted at both longitudinal ends by means of holders (not shown) and which is fixed at a spacing to a carrier plate 3. The surface of the carrier plate 3, which is remote from the fluorescent lamp 2, is referred to hereinafter as the rear side 4. In a corresponding manner therefore the fluorescent lamp 2 is arranged at the front side 5 of the lighting arrangement 1.

Figure 2:
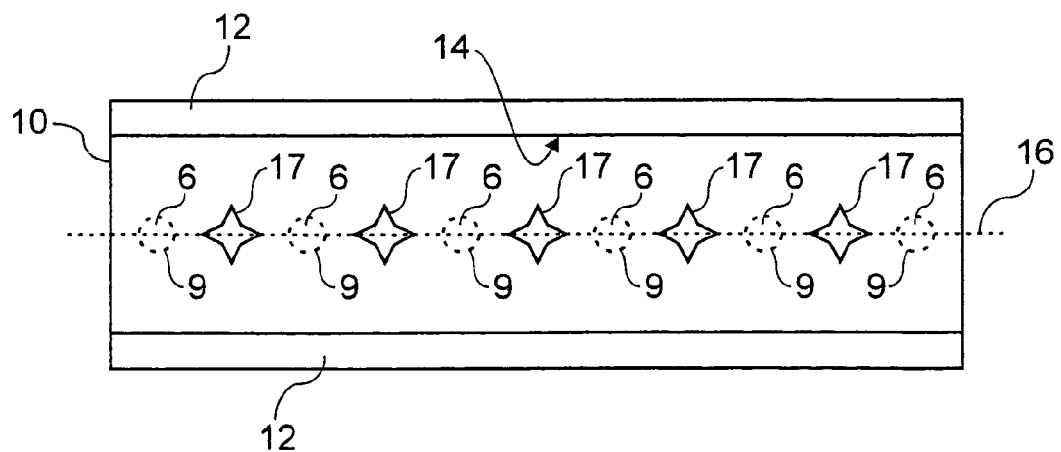
FIG. 2 is a plan view on to the front side of the light guide element of FIG. 1.

The lighting arrangement 1 further includes a number of light emitting diodes 6 which are arranged in a row at spacings from each other along the fluorescent lamp 2 (see FIG. 2). Each light emitting diode 6 is mounted with its contact end 7 on the surface of the carrier plate 3, which faces towards the fluorescent lamp 2, and is thus arranged between the carrier plate 3 and the fluorescent tube 2. In this arrangement the light emitting end 8 of each light emitting diode 6 is embedded in a receiving means 9 which is formed in a light guide element 10 of transparent plastic material, in particular polycarbonate, which is also arranged between the carrier plate 3 and the fluorescent lamp 2. The light guide element 10 is in the shape of a hollow cylinder which is halved along its length and which is arranged in such a way that it encloses the fluorescent lamp 2 at half its side and substantially coaxially. The light guide element 10 is also mounted to the carrier plate 3 by fixing members (not shown).

Thus, as viewed in cross-section, the light guide element 10 is substantially in the shape of a letter 'U', whose bottom or apex 11 faces towards the carrier plate 3 and whose open end is oriented towards the front side 5. The end faces of the limbs of the 'U' of the light guide element 10 serve in this case as light exit surfaces 12. The receiving means 9 is arranged in centered relationship with the light exit surfaces 12 in the apex 11.

Overall the lighting arrangement 1 is of a symmetrical configuration with respect to the surface normal on to the carrier plate 3, which is drawn through the axis of the fluorescent lamp 2. At the same time that axis of symmetry forms the main lighting direction 13 of the lighting arrangement 1. The light L emitted by the lighting arrangement 1 is emitted symmetrically with respect to that main lighting direction 13 in the direction of the front side 5.

In operation of the lighting arrangement a white basic light L1 with a sunlight-like spectral distribution is produced by means of the fluorescent lamp 2. In order to optimise emission of the basic light L1 produced by the fluorescent lamp 2 in the main lighting direction 13, in other words, to minimise stray light losses, the inside surface 14 of the light guide element 10 is coated with a reflecting layer 15 so that the light guide element 10 forms an effective reflector for the fluorescent lamp 2.

Coloured light (referred to hereinafter as coloured light L2) can be superimposed on the basic light L1 by means of the light emitting diodes 6 in order to modify the spectral composition of the light L which is emitted overall by the lighting arrangement 1. The light emitting diodes 6 are of such a design configuration that they emit a large part of the coloured light L2 perpendicularly to the axis of symmetry thereof and thus perpendicularly to the main lighting direction 13, in an annular emission characteristic. The coloured light L2 which is emitted by the light emitting diodes 6 is fed into the light guide element 10 at the wall of the receiving means 9 and is passed around the fluorescent lamp 2 along the curvature of the light guide element 10 tangentially with respect to both sides of the fluorescent lamp 2 and issues from the two exit surfaces 12 of the light guide element 10 in the main lighting direction 13.

FIG. 2 again shows the light guide element 10 as a plan view on to the front side 5. It can be particularly clearly seen from this view that the light emitting diodes 6 are arranged in a linear row in the longitudinal direction 16 of the light guide element 10. Preferably light emitting diodes 6 of different colours are used, in particular of the colours red, green and blue, wherein the light emitting diodes of the various colours are respectively fitted alternately into the light guide element 10. That provides that the coloured light L2 which issues from adjacent light emitting diodes 6 and which is initially of various colours is mixed while still within the light guide element 10. By individual actuation of the red, green and blue light emitting diodes, it is now possible for the spectral composition of the coloured light L2 to be varied, whereby the colour spectrum of the light L which is emitted overall by the lighting arrangement 1 is also modified.

In order to suppress propagation of the coloured light L2 which is fed into the light guide element 10 by the light emitting diodes 6 along the longitudinal direction 16, a light guide structure 17 in the form of a star-shaped opening is provided in the light guide element 10 between each two receiving means 6. By virtue of that light guide structure 17, the coloured light L2 which is fed into the light guide element 10 in the longitudinal direction is deflected in a condition of total reflection transversely with respect to the longitudinal direction 16 and thus in the direction of the closest light exit surface 12.

The invention claimed is:

1. A lighting arrangement (1) comprising a fluorescent lamp (2) and a plurality of light emitting diodes (6) which, viewed along a single axis in the direction of a main lighting direction (13), are arranged behind the fluorescent lamp (2), a light guide element (10) which guides light (L2) emitted by the light emitting diode (6) past the fluorescent lamp (2) and emits said light substantially in the main lighting direction (13), said plurality of said light emitting diodes (6) being arranged along a longitudinal direction (16) of the light guide element (10), and disposed between two adjacently arranged said light emitting diodes (6) is at least one light guide structure (17) for suppressing any longitudinal light propagation in the light guide element (10).

2. The lighting arrangement (1) according to claim 1, wherein said light emitting diodes (6) radiate light into said light guide element (10), said light guide element (10) being elongate and in conformance with the fluorescent lamp (2), and wherein the arrangement of the light emitting diodes (6) in the longitudinal direction thereof extends in parallel with the elongate expanse of the light guide element (10) and with the fluorescent lamp (2).

3. The lighting arrangement (1) according to claim 1, wherein the light guide element (10) is in the form of a hollow shape which is substantially symmetrical with respect to the main lighting direction (13), said hollow shape being opened in the main lighting direction (13) and in which the fluorescent lamp (2) is at least partially located.

4. The lighting arrangement (1) according to claim 3, wherein the shape of the light guide element (10) is substantially that of a hollow cylinder.

5. The lighting arrangement (1) according to claim 1, wherein a light emitting end (8) of each respective light emitting diode (6) is embedded in a receiving means (9) of the light guide element (10).

6. The lighting arrangement (1) according to claim 1, wherein the light emitting diodes (6) are each configured and possess an orientation so as to emit a predominant proportion of the light (L2) produced thereby transversely of the main lighting direction (13).

7. The lighting arrangement (1) according to claim 1, wherein two adjacently arranged of said light emitting diodes (6) are of different colors.

8. The lighting arrangement (1) according to claim 1, wherein an inside surface (14) of the light guide element (10) is in the form of a reflector for light (L1) which is produced by the fluorescent lamp (2).

9. The lighting arrangement (1) according to claim 1, wherein said plurality of said light emitting diodes (6) are mounted on a metallic carrier plate (3).

10. The lighting arrangement (1) according to claim 1, wherein the light guide element (10) is constituted of polycarbonate.

11. A lighting arrangement (1) comprising a fluorescent lamp (2) and a plurality of light emitting diodes (6) which, viewed along a single axis in the direction of a main lighting direction (13), are arranged behind the fluorescent lamp (2), and a light guide element (10) which guides light (L2) emitted by the light emitting diode (6) past the fluorescent lamp (2) and emits said light substantially in the main lighting direction (13), said plurality of said light emitting diodes (6) being arranged along a longitudinal direction (16) of the light guide element (10), said light emitting diodes (6) radiating light into said light guide element (10), wherein said light guide element (10) is elongate and in conformance with the fluorescent lamp (2), and wherein the arrangement of the light emitting diodes (6) in the longitudinal direction thereof extends in parallel with the elongate expanse of the light guide element (10) and with the fluorescent lamp (2).

12. The lighting arrangement (1) according to claim 11, wherein the light guide element (10) is in the form of a hollow shape which is substantially symmetrical with respect to the main lighting direction (13), said hollow shape being opened in the main lighting direction (13) and in which the fluorescent lamp (2) is at least partially located.

13. The lighting arrangement (1) according to claim 12, wherein the shape of said light guide element (10) is substantially that of a hollow cylinder.

14. The lighting arrangement (1) according to claim 11, wherein a light emitting end (8) of each respective light emitting diode (6) is embedded in a receiving means (9) of the light guide element (10).

15. The lighting arrangement (1) according to claim 11, wherein the light emitting diodes (6) are each configured and possess an orientation so as to emit a predominant proportion of the light (L2) produced thereby transversely of the main lighting direction (13).

16. The lighting arrangement (1) according to claim 11, wherein two adjacently arranged of said light emitting diodes (6) are of different colors.

17. The lighting arrangement (1) according to claim 16, wherein disposed between two said adjacently arranged light emitting diodes (6) is at least one light guide structure (17) for suppressing any longitudinal light propagation in the light guide element (10).

18. The lighting arrangement (1) according to claim 11, wherein an inside surface (14) of the light guide element (10) is in the form of a reflector for light (L1) which is produced by the fluorescent lamp (2).

19. The lighting arrangement (1) according to claim 11, wherein said plurality of light emitting diodes (6) are mounted on a metallic carrier plate (3).

20. The lighting arrangement (1) according to claim 11, wherein the light guide element (10) is constituted of polycarbonate.

21. The lighting arrangement (1) according to claim 11, wherein disposed between two adjacently arranged light emitting diodes (6) is at least one light guide structure (17) for suppressing any longitudinal light propagation in the light guide element (10).

* * * * *